Sept. 2, 1930.  P. E. MATTHEWS  1,774,991
SELF ADJUSTING RADIUS ROD
Filed April 15, 1929
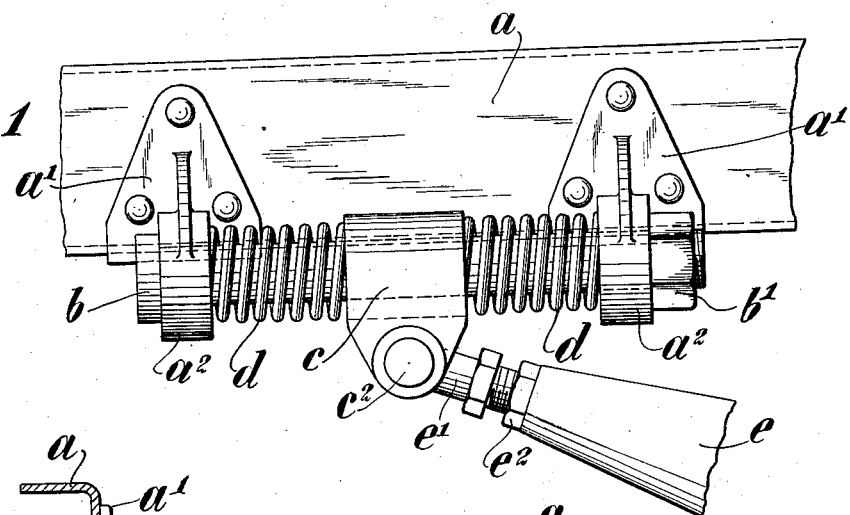
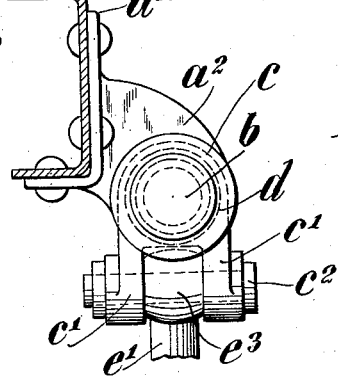
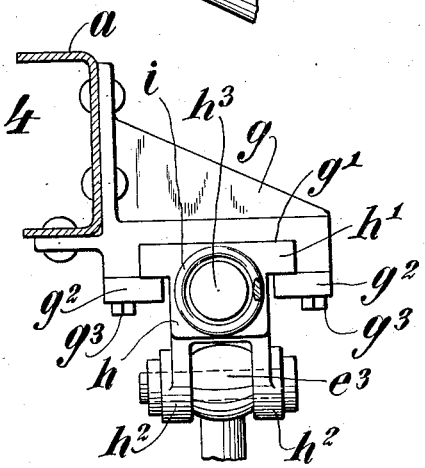
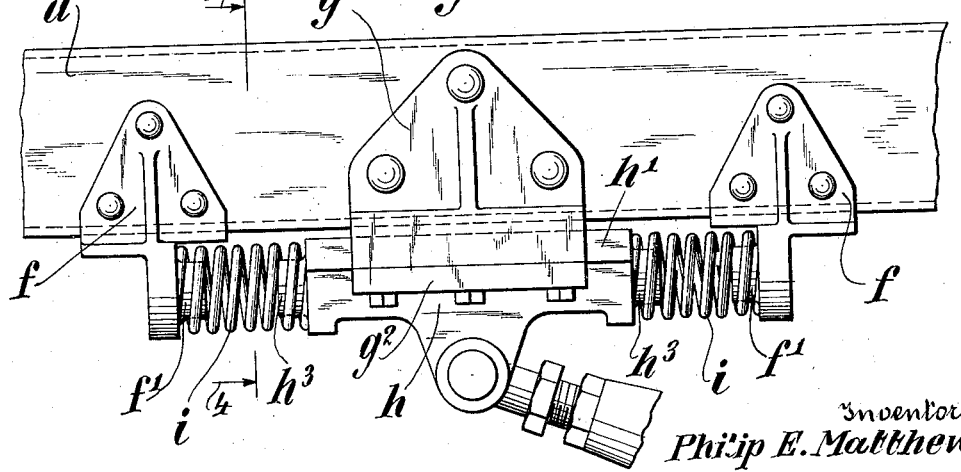
Inventor:
Philip E. Matthews,
By his attorneys:
Redding, Greeley, O'Shea & Campbell Patented Sept. 2, 1930

1,774,991

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

SELF-ADJUSTING RADIUS ROD

Application filed April 15, 1929. Serial No. 355,118.

The present invention relates to radius rods for spacing the axle of a motor vehicle from the frame in such manner that the driving reactions may be properly transmitted from the wheels to the body of the vehicle. More particularly, the invention embodies an improved form of connection between a radius rod and frame member of the vehicle, the connection being of such character that a degree of movement between these members may be yieldingly accommodated.

In vehicles of the chain drive type more particularly, the chain frequently becomes locked, this condition resulting from the accumulation of clay, stones or other impediments between the links of the chains and the sprockets. This condition imposes enormous strains upon the vehicle frame as well as all of the driving members and it is very desirable to reduce the deleterious effects thereof as far as possible. A further objectionable condition which frequently arises is that in which a driving wheel becomes lodged in positions where the traction available is reduced materially. The consequent slipping due to poor traction prevents the acceleration of the truck and additional means must be sought to relieve the condition.

It is an object of this invention, accordingly, to provide an improved form of radius rod which is connected to the frame in such manner that a degree of movement between the wheel and frame is yieldingly accommodated.

A further object of the invention is to provide a construction of the above character in which the traction is materially increased by reason of the provision for a degree of movement of the wheel before the full accelerating and driving forces are impressed upon the frame, thus permitting the wheel to get in motion before the driving reactions are fully carried thereby.

A further object of the invention is to provide an improved connection between a radius rod and frame member of the vehicle wherein provision is made for accommodating a degree of movement between the radius rod and frame, the connection therebetween being simple in construction and possessing great strength.

The above objects are attained by the provision of a member which is bodily movable with respect to the frame, such movements being cushioned, and connecting one end of the radius rod to such member.

Further objects, not specifically enumerated above, will be apparent as the invention is described in greater detail in connection with the accompanying drawings, wherein:

Figure 1 is a view in side elevation, showing one form of the invention.

Figure 2 is a view in end elevation, showing the device of Figure 1.

Figure 3 is a view in side elevation showing a modified form of the invention.

Figure 4 is a view in section, taken on line 4—4 of Figure 3, and looking in the direction of the arrows.

Referring particularly to Figures 1 and 2, $a$ designates the side frame member of a vehicle chassis upon which brackets $a'$ are secured. These brackets are formed with apertured extensions $a^2$ within which a bolt $b$ is mounted. A nut $b'$ secures the bolt in place and a head $c$ is slidable thereon, the sliding movement thereof being yieldingly resisted by coil springs $d$.

The radius rod $e$ is formed with an extensible member $e'$, the position of which upon the radius rod may be adjusted by means of adjusting nuts $e^2$. The end $e^3$ of the extensible member is journaled between the yoke-shaped extensions $c'$ upon the head $c$, a pin $c^2$ passing through the end $e^3$ and the extensions $c'$.

It will be seen from the foregoing description, that the head $c$ may move axially upon the bolt $b$, such movement being yieldingly resisted by springs $d$. In this manner, the deleterious stresses due to the locking of the chain, and other injurious conditions, are relieved. In addition to the foregoing, the traction during acceleration is increased since the wheel may get into motion before assuming the full load accelerating reactions.

Referring to Figures 3 and 4, the vehicle side frame member $a$ carries spaced brackets $f$ formed with spring seats $f'$. An intermediate bracket $g$ is mounted on the frame and formed with a squared inverted recess $g'$, the lower extremities carrying retaining flanges $g^2$ which are secured to the bracket by means of bolts $g^3$. A cross head $h$ is formed with a T-shaped head $h'$ which is carried in the inverted recess $g'$ and retained in such position by means of flanges $g^2$. Depending forked extremities $h^2$ receive the end $e^3$ of the radius rods in a similar manner to the construction shown in Figures 1 and 2.

At either end of the cross head $h$, spring seats $h^3$ are formed, coil springs $i$ being seated between the respective seats $f'$ and $h^3$ to cushion the longitudinal movement of the cross head $h$ in the bracket $g$. The operation of the device shown in Figures 3 and 4 corresponds closely to that shown in Figures 1 and 2 and further description thereof is deemed unnecessary.

While the invention has been shown as embodied in the specific constructions shown in the accompanying drawings, it will be apparent that it includes all devices in which a member is yieldingly mounted upon the frame to partake of movement of translation, and the scope thereof is not to be limited, save as defined in the appended claim.

I claim as my invention:

In combination, a vehicle frame, a radius rod, spaced brackets on the frame, an intermediate bracket between the first bracket and formed with a slide groove, a member movable with respect to the brackets and slidably carried in the groove to restrict the movement of such member to a plane including said brackets, seats upon the first brackets and the adjacent faces of the movable member, coil springs mounted in the seats between the brackets and the member to cushion movement thereof, and means to connect the member to the radius rod.

This specification signed this 10th day of April, A. D. 1929.

PHILIP E. MATTHEWS.